(12) United States Patent
Hoff et al.

(10) Patent No.: US 12,398,793 B2
(45) Date of Patent: Aug. 26, 2025

(54) TORQUE CONVERTER WITH FLOATING HUB

(71) Applicant: Schaeffler Technologies AG & Co. KG, Herzogenaurach (DE)

(72) Inventors: Austin Hoff, New Franklin, OH (US); Joshua Halvorsen, Wooster, OH (US); David Avins, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/753,493

(22) Filed: Jun. 25, 2024

(65) Prior Publication Data
US 2025/0189024 A1    Jun. 12, 2025

Related U.S. Application Data

(60) Provisional application No. 63/607,465, filed on Dec. 7, 2023.

(51) Int. Cl.
*F16H 45/02*    (2006.01)
*F16D 3/06*    (2006.01)

(52) U.S. Cl.
CPC ............... *F16H 45/02* (2013.01); *F16D 3/06* (2013.01); *F16H 2045/0221* (2013.01); *F16H 2045/0294* (2013.01)

(58) Field of Classification Search
CPC ................. F16H 45/02; F16H 2045/002–0294
See application file for complete search history.

(56) References Cited

U.S. PATENT DOCUMENTS

| | | | | |
|---|---|---|---|---|
| 4,441,595 A * | 4/1984 | Lamarche | ............... | F16H 45/02 192/3.29 |
| 4,694,941 A * | 9/1987 | Hall | ........................ | F16H 45/02 192/70.19 |
| 6,142,272 A * | 11/2000 | Meisner | ................ | F16F 15/139 192/3.3 |
| 6,712,186 B1 * | 3/2004 | Arhab | ..................... | F16H 45/02 192/3.29 |
| 7,077,253 B2 * | 7/2006 | Maienschein | ........... | F16H 45/02 192/3.3 |
| 7,191,879 B2 * | 3/2007 | Arhab | ..................... | F16H 45/02 29/889.5 |
| 7,658,679 B2 | 2/2010 | Avins et al. | | |

(Continued)

*Primary Examiner* — James J Taylor, II

(57) ABSTRACT

A torque converter is provided that includes a front cover arranged to receive a torque, an impeller having an impeller shell non-rotatably connected to the cover, and a turbine in fluid communication with the impeller and including a turbine shell. A damper assembly is disposed axially between the front cover and the turbine shell. The damper assembly includes an output element including a first tooth; a cover plate disposed axially between the output element and the turbine shell; and a floating hub arranged to connect to a transmission input shaft. The cover plate is non-rotatably connected to the turbine shell. The floating hub includes a second tooth configured to rotationally engage the first tooth. The second tooth includes an extension disposed between the cover plate and the output element. The extension is configured to contact the output element to axially constrain the floating hub in a first axial direction.

13 Claims, 2 Drawing Sheets

(56) References Cited

U.S. PATENT DOCUMENTS

| | | | | |
|---|---|---|---|---|
| 7,708,126 B2* | 5/2010 | Arhab | ............... | F16H 45/02 |
| | | | | 192/3.3 |
| 8,033,370 B2* | 10/2011 | Degler | ............ | F16F 15/129 |
| | | | | 192/3.3 |
| 8,047,345 B2* | 11/2011 | Degler | ............. | F16H 45/02 |
| | | | | 192/3.29 |
| 8,127,905 B2* | 3/2012 | Kneidel | .......... | F16F 15/129 |
| | | | | 192/213.22 |
| 8,135,525 B2 | 3/2012 | Swank et al. | | |
| 9,702,445 B2 | 7/2017 | Kawahara | | |
| 9,719,588 B2* | 8/2017 | Carrier | ............. | F16H 45/02 |
| 10,323,714 B2* | 6/2019 | Inoue | ............... | F16H 45/02 |
| 10,451,158 B2 | 10/2019 | Vanni et al. | | |
| 11,846,344 B1 | 12/2023 | Hoff | | |
| 2010/0133063 A1 | 6/2010 | Degler | | |

* cited by examiner

TORQUE CONVERTER WITH FLOATING HUB

CROSS-REFERENCE TO RELATED APPLICATIONS

This application claims the benefit of U.S. Provisional Patent Application No. 63/607,465, filed Dec. 7, 2023, the disclosure of which is incorporated in its entirety by reference herein.

TECHNICAL FIELD

The present disclosure relates generally to torque converters and more specifically to torque converters with a floating hub.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, most torque converters include a bypass or lock-up clutch that mechanically couples the turbine shaft to a case of the torque converter to bypass the fluid coupling. In some torque converter arrangements, the torque converter may include a damper assembly having an output flange non-rotatably connected, e.g., via a rivet, welded connection, staking, etc., to an output hub configured to transmit torque to a transmission input shaft. It is desirable to have alternative designs and configurations to fit all necessary components within the torque converter while still meeting durability and performance requirements.

SUMMARY

Embodiments of the present disclosure provide a torque converter including: a front cover arranged to receive a torque; an impeller having an impeller shell non-rotatably connected to the cover; a turbine in fluid communication with the impeller and including a turbine shell; and a damper assembly disposed axially between the front cover and the turbine shell. The damper assembly includes: an output element including a first tooth; a cover plate disposed axially between the output element and the turbine shell; and a floating hub arranged to connect to a transmission input shaft. The cover plate is non-rotatably connected to the turbine shell. The floating hub includes a second tooth configured to rotationally engage the first tooth. The second tooth includes an extension disposed between the cover plate and the output element. The extension is configured to contact the output element to axially constrain the floating hub in a first axial direction.

In embodiments, the floating hub may be axially moveable relative to the output element. In embodiments, the cover plate may include a tab axially spaced from the output element. The tab and the output element may define a gap therebetween. The cover plate may include a further tab having a first portion extending transverse to the tab and a second portion disposed in the gap. The second portion may contact the output element. The second portion may be configured to transfer thrust forces between the output element and the cover plate. The further tab may be radially spaced from the extension. The tab may be configured to axially constrain the floating hub in a second axial direction.

In embodiments, the torque converter may further include a lock-up clutch assembly having a piston plate configured to slide axially along the floating hub. The piston plate may be sealed to the floating hub. The torque converter may further include a thrust washer arranged, at least partially, between the piston plate and the output element. The thrust washer may be configured to transfer thrust forces between the piston plate and the output element.

Embodiments of the present disclosure further provide a damper assembly including: an output element including a first tooth; a cover plate configured to connect to a turbine shell; and a floating hub arranged to connect to a transmission input shaft. The floating hub includes a second tooth configured to rotationally engage the first tooth. The second tooth includes an extension disposed between the cover plate and the output element. The extension is configured to contact the output element to axially constrain the floating hub in a first axial direction.

In embodiments, the floating hub may be axially moveable relative to the output element. In embodiments, the cover plate may include a tab axially spaced from the output element. The tab and the output element may define a gap therebetween. The cover plate may include a further tab having a first portion extending transverse to the tab and a second portion disposed in the gap. The second portion may contact the output element. The second portion may be configured to transfer thrust forces between the output element and the cover plate. The further tab may be radially spaced from the extension. The tab may be configured to axially constrain the floating hub in a second axial direction.

Embodiments of the present disclosure further provide a method for assembling a damper assembly. The method includes providing a first cover plate. The method further includes inserting a spring into a spring window defined by the first cover plate. The method further includes aligning an output element to engage the spring. The output element including a first tooth. The method further includes meshing a second tooth on a floating hub with the first tooth. The output element is disposed axially between the first cover plate and an extension of the second tooth. The method further includes aligning a second cover plate to axially support the spring. The extension is disposed axially between the output element and the cover plate. The method further includes non-rotatably connecting the first cover plate to the second cover plate.

In embodiments, the floating hub may be axially moveable relative to the output element.

Embodiments disclosed herein provide the advantageous benefit of reduced costs and complexity of torque converters, for example, by removing a connection that typically fixes the output flange to the output hub. Furthermore, embodiments disclosed herein offer design advantages by permitting axial movement between the output flange and the output hub, which can reduce wear and hysteresis of the damper assembly.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
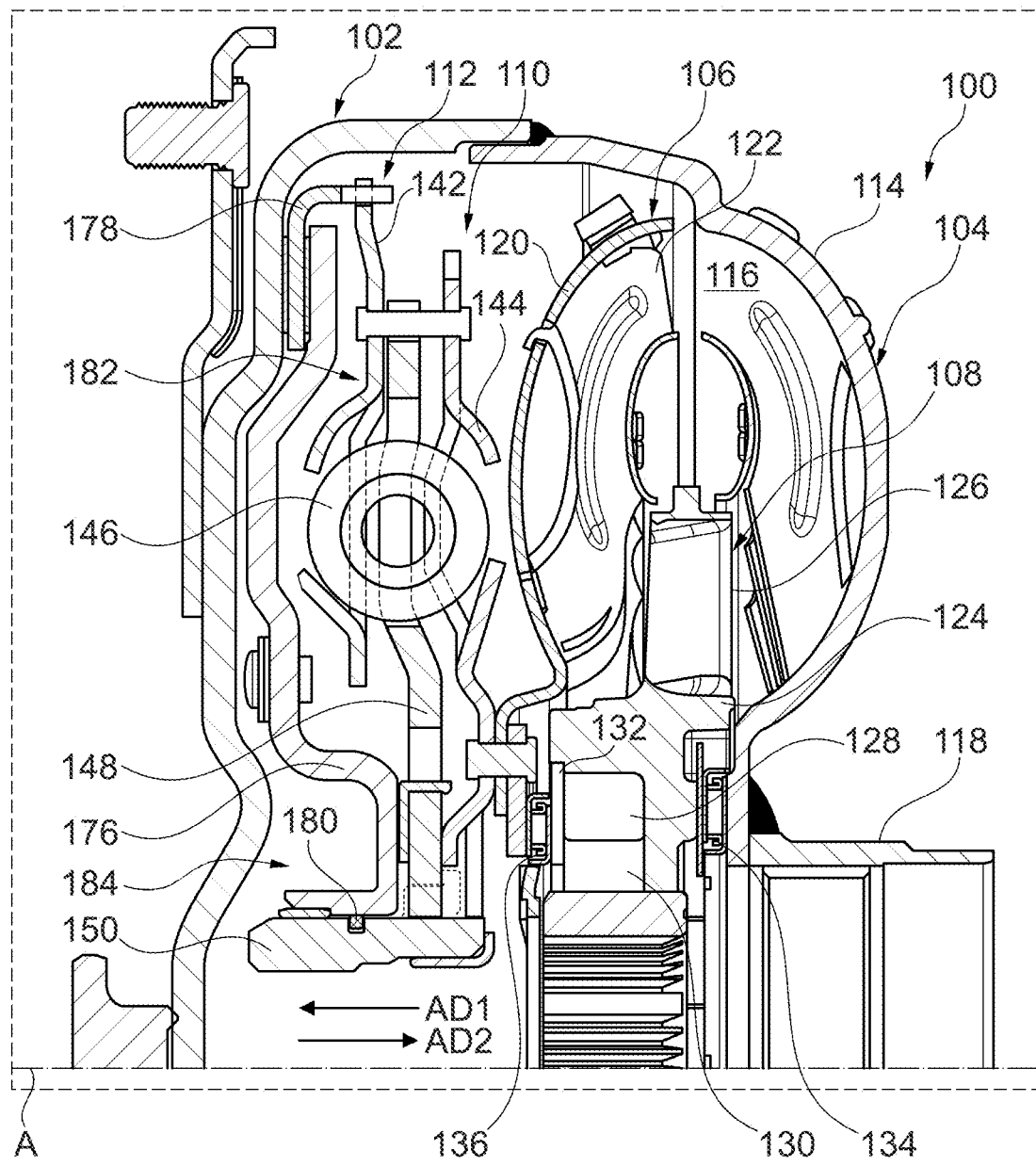
FIG. 1 is a cross-sectional view of a torque converter having a floating hub according to an embodiment of the present disclosure.
Figure 2:
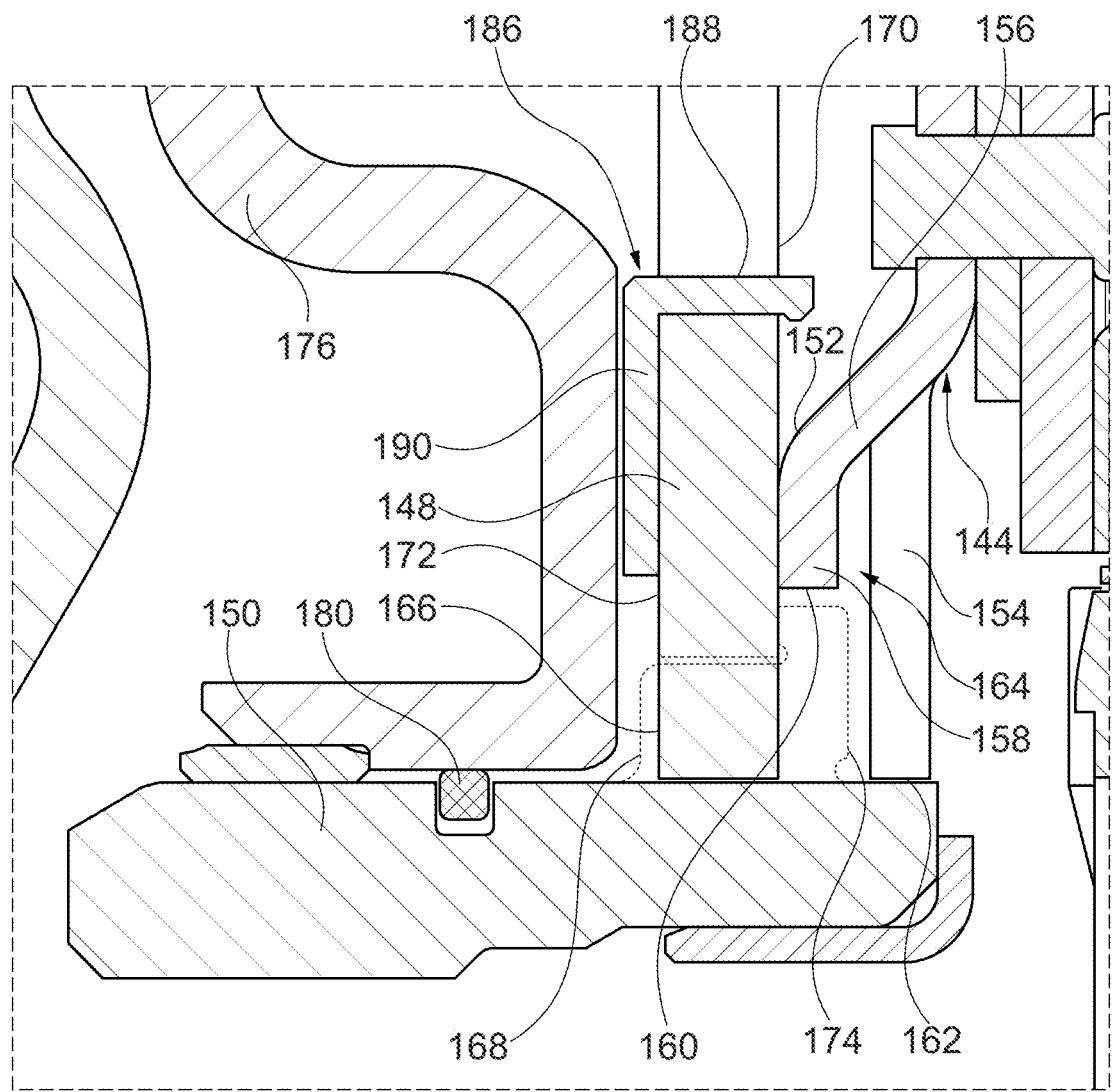
FIG. 2 is an enlarged view of an area of the torque converter shown in FIG. 1 showing the floating hub.

Referring to FIGS. 1-2, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; a damper assembly 110; and a lock up clutch assembly 112. The impeller assembly 104 includes: an impeller shell 114 non-rotatably connected to the front cover 102; at least one impeller blade 116 attached to an inner surface of the impeller shell 114; and an impeller hub 118 fixed to a radially inner end of the impeller shell 114. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The turbine assembly 106 includes: a turbine shell 120; and at least one turbine blade 122 attached to the turbine shell 120. The torque converter 100 may include a stator assembly 108 disposed axially between the turbine assembly 106 and the impeller assembly 104 to redirect fluid flowing from the turbine blade 122 before the fluid reaches the impeller assembly 104 to increase the efficiency of torque converter 100. For example, the impeller blade 116, when rotated about the central axis A, pushes fluid outwardly. The fluid pushes against the turbine assembly 106, causing the turbine assembly 106 to revolve about the central axis A. The stator assembly 108 functions to return the fluid from the turbine assembly 106 back to the impeller assembly 104 with minimal or no power loss.

Stator assembly 108 may further include: a stator body 124; at least one stator blade 126 attached thereto; a one-way clutch 128; and a stator hub 130. A side plate 132 may be provided axially between the stator assembly 108 and the turbine assembly 106 and may be configured to retain or hold the one-way clutch 128 within the stator body 124. An axial thrust bearing 134 may be provided axially between the stator assembly 108 and the impeller assembly 104. An axial thrust bearing 136 may further be provided axially between a radially extending inner portion of the turbine shell 120 and the stator assembly 108.

The damper assembly 110 is positioned axially between the front cover 102 and the turbine assembly 106 and is configured for transferring torque from the front cover 102 to a transmission input shaft (not shown). The damper assembly 110 may include: springs 146; a cover plate 142; a cover plate 144; an output element, or flange, 148; and a floating hub 150. The cover plate 142 may support the springs 146 on one axial side. The cover plate 144 may support the springs 146 on another, opposite axial side. The cover plates 142, 144 may be connected, for example, via a rivet radially outside the springs 146. The cover plate 142 may be connected to the lock-up clutch assembly 112, and the cover plate 144 may be connected to the turbine shell 120. That is, the cover plates 142, 144 are arranged to act as an input to the damper assembly 110.

The cover plate 144 may include a first tab 152 and a second tab 154. The first tab 152 includes a first portion 156 and a second portion 158. The first portion 156 extends transverse to the second tab 154, and the second portion 158 extends radially inwardly from the first portion 158 to an end 160. The end 160 of the first tab 152 is disposed axially between the output element 148 and the second tab 154. The first tab 152 is configured such that the second portion 158 may contact the output element 148, e.g., to transfer thrust forces therebetween.

The second tab 154 is axially spaced from the output element 148. That is, a gap 164 is defined axially between the output element 148 and the second tab 154. The second portion 158 of the first tab 152 is disposed in the gap 164. The second tab 154 extends radially inward of the first tab 152. That is, an end 162 of the second tab 154 is disposed at a radius radially between the floating hub 150 and a radius of the end 160 of the first tab 152.

The output element 148 includes a plurality of teeth 166 arranged at an inner diameter thereof and extending radially inwardly therefrom. The plurality of teeth 166 may be spaced from each other circumferentially about the central axis A. The teeth 166 are configured to engage the floating hub 150 so as to non-rotatably connect the output element 148 to the floating hub 150.

The output element 148 includes a first thrust surface 170 facing the cover plate 144 and a second thrust surface 172 facing the front cover 102. The thrust surfaces 170, 172 may extend in a plane substantially perpendicular to the central axis A. By "substantially perpendicular," we mean that the plane extends radially outwardly from an outer diameter of the floating hub 150, even if the plane may deviate from perpendicular to the central axis A, e.g., to due manufacturing tolerances and/or capabilities.

The floating hub 150 is connected to the transmission input shaft (not shown), e.g., via a splined connection, for torque transmission therebetween. The floating hub 150 includes a plurality teeth 168 arranged at an outer diameter thereof and extending radially outwardly therefrom. The plurality of teeth 168 may be spaced from each other circumferentially about the central axis A. The plurality of teeth 168 are configured to drivingly engage with the teeth 166 of the output element 148 to transmit torque between the output element 148 and the floating hub 150. Each tooth 168 includes an extension 174. Each extension 174 is disposed on one axial side of the respective tooth 168 and extends radially outward of the corresponding tooth 168. Specifically, the teeth 168 are configured to mesh with the teeth 166 of the output element 148, and the extensions 174 are disposed axially between the output element 148 and the second tab 154 of the cover plate 144.

The floating hub 150 may be axially moveable relative to the output element 148 and the transmission input shaft (not shown). For example, an axial distance between the first thrust surface 170 of the output element 148 and the second tab 154 of the cover plate 144 may be greater than an axial width of the extensions 174. In such an example, the floating hub 150 may axially move relative to the transmission input shaft (not shown).

The extensions 174 are radially spaced from the end 160 of the first tab 152 so as to permit rotation of the floating hub 150 relative to the cover plate 144. The extensions 174 axially constrain the floating hub 150. Specifically, during axial movement of the floating hub 150 relative to the output element 148 in a first axial direction AD1, the extensions 174 may contact the first thrust surface 170 of the output element 148 so as to limit axial movement of the floating hub 150 in the first axial direction AD1. Additionally, during axial movement of the floating hub 150 relative to the output element 148 in a second axial direction AD2, the extensions 174 may contact the second tab 154 so as to limit axial movement of the floating hub 150 in the second axial direction AD2.

The floating hub 150 and the output element 148 may include any suitable number of teeth 166, 168, respectively, such that the teeth 166, 168 rotatably engage each other. The cover plate 144 may include any suitable number of tabs 152, 154. The cover plate 144 may, for example, include a same number of second tabs 154 as a number of teeth 168 of the floating hub 150 so that each second tab 154 can axially constrain one respective extension 174. The cover plate 144 may include a same number of first tabs 152 as second tabs 154.

The lock-up clutch assembly 112 is configured to selectively transfer torque from the front cover 102 to the transmission input shaft (not shown) and includes a piston plate 176 and a clutch plate 178. The clutch plate 178 is disposed, at least partially, between the front cover 102 and the piston plate 176 and is connected to the cover plate 142 of the damper assembly 110, e.g., via a tabbed connection. The piston plate 176 may be disposed axially between the front cover 102 and the cover plate 142 and configured to be sealed to the floating hub 150 at an inner end thereof via seal 180. The piston plate 176 may further be connected to the front cover 102 via a leaf-spring connection that allows axial displacement of the piston plate 180 in a first axial direction AD1 and a second axial direction AD2 for selective engagement of the lock-up clutch assembly 112.

During axial movement of the piston plate 176, the piston plate 176 slides along the floating hub 150. The piston plate 176 closes the lock-up clutch assembly 112 in response to pressurization of a medium (e.g., fluid such as oil) in a piston apply chamber 182 defined between the impeller shell 114 and the piston plate 176. Seal 180 maintains a fluid separation between the piston apply chamber 182 and a piston release chamber 184. The piston release chamber 184 is defined by, or bounded between, the front cover 102 and the piston plate 176. By "bounded in part," we mean that a portion of the cited chamber, flow path, or other structure is bounded, or formed, by the cited element.

The torque converter 100 may include a thrust washer 186. The thrust washer 186 may include a first portion 188 extending through an opening (not numbered) in the output element 148 and a second portion 190 extending radially inwardly from the first portion 188. The second portion 190 is arranged between the output element 148 and the piston plate 176. The second portion 190 is configured to be compressed between the output element 148 and the piston plate 176 to transfer thrust forces therebetween. That is, the second portion 190 contacts the second thrust surface 172 of the output element 148. The second portion 190 may include grooves (not shown). The grooves may be provided to allow fluid flow between piston apply chamber 182 and the transmission input shaft (not shown). That is, pressurized fluid may be supplied from the transmission input shaft (not shown) and then routed between the piston plate 180 and the thrust washer 186 via grooves to the piston apply chamber 182.

To assemble the damper assembly 110, the cover plate 142 is provided. The springs 146 are then arranged in respective spring windows (not numbered) defined by the cover plate 142. The output element 148 is then arranged so as to engage the springs 146. The floating hub 150 is then arranged such that the teeth 168 of the floating hub 150 mesh with the teeth 166 of the output element 148. The cover plate 144 is then arranged such that the output element 148 is axially between the cover plates 142, 144, and the extensions 174 are axially between the output element 148 and the second tabs 154. Additionally, the springs 146 are arranged in corresponding spring windows (not shown) defined by the cover plate 144. The cover plates 142, 144 are then non-rotatably connected to each other, e.g., via a rivet. The cover plate 144 may then be non-rotatably connected, e.g., via a rivet, to another component in the torque converter 100, e.g., to the turbine assembly 106, and the cover plate 142 may then be drivingly connected to the clutch plate 178. Additionally, the floating hub 150 may be non-rotatably connected to the transmission input shaft 140.

Permitting axial movement of the floating hub 150 relative to the output element 148 reduces wear and hysteresis for the damper assembly 110. Additionally, providing the cover plate 142 with the tabs 152, 154 axially constrains the floating hub 150 while still permitting transmission of thrust loads through the cover plate 142, thrust washer 186, and piston plate 180 in a direct linear manner without requiring the floating hub 150 to transfer the thrust loads.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover 104 impeller assembly
106 turbine assembly
108 stator assembly
110 damper assembly
112 lock-up clutch assembly
114 impeller shell
116 one impeller blade
118 impeller hub
120 turbine shell
122 one turbine blade
124 stator body
126 one stator blade
128 one-way clutch
130 stator hub
132 side plate
134 axial thrust bearing
136 axial thrust bearing
142 cover plate
144 cover plate
146 springs
148 output element, flange
150 floating hub
152 tab
154 tab
156 portion
158 portion
160 end
162 end
164 gap
166 teeth
168 teeth
170 thrust surface
172 thrust surface
174 extension
176 piston plate
178 clutch plate
180 seal
182 piston apply chamber
184 piston release chamber
186 thrust washer
188 portion
190 portion
A central axis
AD1 first axial direction
AD2 second axial direction

What is claimed is:

1. A torque converter, comprising:
a front cover arranged to receive a torque;
an impeller having an impeller shell non-rotatably connected to the front cover;
a turbine in fluid communication with the impeller and including a turbine shell;
a damper assembly disposed axially between the front cover and the turbine shell, the damper assembly including:
an output element including a first tooth;
a cover plate disposed axially between the output element and the turbine shell, the cover plate being non-rotatably connected to the turbine shell; and
a floating hub arranged to connect to a transmission input shaft, the floating hub including a second tooth configured to rotationally engage the first tooth;
wherein:
the second tooth includes an extension disposed between the cover plate and the output element, the extension being configured to contact the output element to axially constrain the floating hub in a first axial direction;
the cover plate includes a tab axially spaced from the output element, the tab and the output element defining a gap therebetween; and
the cover plate includes a further tab having a first portion extending transverse to the tab and a second portion disposed in the gap.

2. The torque converter according to claim 1, wherein the floating hub is axially moveable relative to the output element.

3. The torque converter according to claim 1, wherein the second portion contacts the output element.

4. The torque converter according to claim 1, wherein the second portion is configured to transfer thrust forces between the output element and the cover plate.

5. The torque converter according to claim 1, wherein the further tab is radially spaced from the extension.

6. The torque converter according to claim 1, wherein the tab is configured to axially constrain the floating hub in a second axial direction.

7. A torque converter, comprising:
a front cover arranged to receive a torque;
an impeller having an impeller shell non-rotatably connected to the front cover;
a turbine in fluid communication with the impeller and including a turbine shell;
a damper assembly disposed axially between the front cover and the turbine shell, the damper assembly including:
an output element including a first tooth;
a cover plate disposed axially between the output element and the turbine shell, the cover plate being non-rotatably connected to the turbine shell;
a floating hub arranged to connect to a transmission input shaft, the floating hub including a second tooth configured to rotationally engage the first tooth;
a lock-up clutch assembly having a piston plate configured to slide axially along the floating hub, the piston plate being sealed to the floating hub; and
a thrust washer arranged, at least partially, between the piston plate and the output element, wherein:
the second tooth includes an extension disposed between the cover plate and the output element, the extension being configured to contact the output element to axially constrain the floating hub in a first axial direction; and
the thrust washer is configured to transfer thrust forces between the piston plate and the output element.

8. A damper assembly, comprising:
an output element including a first tooth;
a cover plate configured to connect to a turbine shell; and
a floating hub arranged to connect to a transmission input shaft, the floating hub including a second tooth configured to rotationally engage the first tooth;
wherein:
the second tooth includes an extension disposed between the cover plate and the output element, the extension being configured to contact the output element to axially constrain the floating hub in a first axial direction;
the cover plate includes a tab axially spaced from the output element, the tab and the output element defining a gap therebetween; and the cover plate includes a further tab having a first portion extending transverse to the tab and a second portion disposed in the gap.

9. The damper assembly according to claim 8, wherein the floating hub is axially moveable relative to the output element.

10. The damper assembly according to claim 8, wherein the second portion contacts the output element.

11. The damper assembly according to claim 8, wherein the second portion is configured to transfer thrust forces between the output element and the cover plate.

12. The damper assembly according to claim 8, wherein the further tab is radially spaced from the extension.

13. The damper assembly according to claim 8, wherein the tab is configured to axially constrain the floating hub in a second axial direction.

* * * * *